United States Patent
Tang

(10) Patent No.: US 8,744,628 B2
(45) Date of Patent: Jun. 3, 2014

(54) AUTONOMOUS MOVING FLOOR-TREATING ROBOT AND CONTROL METHOD THEREOF FOR EDGE-FOLLOWING FLOOR-TREATING

(75) Inventor: Jinju Tang, Suzhou (CN)

(73) Assignee: Ecovacs Robotics (Suzhou) Co., Ltd., Suzhou, Jiangsu (CN)

( * ) Notice: Subject to any disclaimer, the term of this patent is extended or adjusted under 35 U.S.C. 154(b) by 229 days.

(21) Appl. No.: 13/500,802

(22) PCT Filed: Jul. 30, 2010

(86) PCT No.: PCT/CN2010/075584
§ 371 (c)(1),
(2), (4) Date: May 25, 2012

(87) PCT Pub. No.: WO2011/041959
PCT Pub. Date: Apr. 14, 2011

(65) Prior Publication Data
US 2012/0232696 A1    Sep. 13, 2012

(30) Foreign Application Priority Data
Oct. 9, 2009    (CN) .......................... 2009 1 0178129

(51) Int. Cl.
*G05B 15/00*    (2006.01)
*G05B 19/04*    (2006.01)

(52) U.S. Cl.
USPC ............ 700/258; 700/245; 700/250; 700/252

(58) Field of Classification Search
USPC .................................. 700/245, 250, 252, 258
See application file for complete search history.

(56) References Cited

U.S. PATENT DOCUMENTS 7,429,843 B2 *    9/2008    Jones et al. .............. 318/568.12

2002/0120364 A1 *    8/2002    Colens ......................... 700/262

(Continued)

FOREIGN PATENT DOCUMENTS

| CN | 101126808 A | 2/2008 |
|----|-------------|--------|
| GB | 2344900 A | 6/2000 |
| JP | 4096720 A | 3/1992 |

OTHER PUBLICATIONS

International Search Report corresponding to co-pending International Patent Application Serial No. PCT/CN2010/075584, dated Jul. 30, 2010.

*Primary Examiner* — Ian Jen
(74) *Attorney, Agent, or Firm* — Nixon Peabody LLP

(57) ABSTRACT

An autonomous moving floor-treating robot and a control method thereof for edge-following floor-treating are provided. The control method includes the following steps: the floor-treating robot collides with an obstacle and is deflected toward the direction away from the obstacle by a basic angle after the collision, measures an initial signal strength value by a side-looking sensor after the deflection, and then moves on and treats the floor; a real-time signal strength value is acquired by said side-looking sensor alter the robot runs for a predetermined time; the difference value between said two signal strength values is compared, and whether the difference value is in a predetermined range is judged, if yes, the robot keeps moving and treating the floor, if not, the robot is driven to be deflected by an adjusting angle and acquires the current real-time signal strength value; the difference value between said current and the last real-time signal strength values is compared, and whether the difference value is in a predetermined range is judged, if yes, the robot keeps moving and treating the floor, if not, the steps of deflection, comparing and so on are implemented. The present invention is unaffected by the media of the obstacle, and can effectively treat the edge region of the obstacle.

22 Claims, 5 Drawing Sheets

(56) References Cited

U.S. PATENT DOCUMENTS

| | | |
|---|---|---|
| 2004/0158357 A1* | 8/2004 | Lee et al. .................... 700/258 |
| 2005/0235451 A1 | 10/2005 | Yan |
| 2007/0213892 A1* | 9/2007 | Jones et al. ................... 701/23 |
| 2008/0001566 A1* | 1/2008 | Jones et al. ............. 318/568.17 |
| 2008/0015738 A1 | 1/2008 | Casey et al. |
| 2008/0276407 A1* | 11/2008 | Schnittman et al. ............ 15/319 |
| 2009/0254218 A1* | 10/2009 | Sandin et al. ................. 700/258 |

\* cited by examiner

AUTONOMOUS MOVING FLOOR-TREATING ROBOT AND CONTROL METHOD THEREOF FOR EDGE-FOLLOWING FLOOR-TREATING

CROSS REFERENCE TO RELATED APPLICATIONS

This application is a U.S. national stage application claiming priority from International Application No. PCT/CN2010/075584, filed Jul. 30, 2010, and further claiming priority to Chinese patent application No. 200910178129.0, filed on Oct. 9, 2009, each of which is incorporated herein by reference in its entirety.

FIELD OF THE INVENTION

The present invention relates to an intelligent robot, in particular relates to an autonomous moving floor-treating robot and control method thereof for edge-following floor-treating.

DESCRIPTION OF THE PRIOR ART

Having integrated the technologies of mobile robot and dust collector, intelligent robots, including mopping robot and cleaning robot, represent the most challenging hot spot in the field of household appliances. Since 2000, commercial products of cleaning robots have successively come into market, becoming a new type high-tech product in the field of service robot and presenting considerable market prospect.

As a rule, crash sensors or detection sensors are provided in the front of robot, and sensors are also provided on the side of robot. According to need, the lateral sensors can merely provided on the right side along the forward direction of robot, or set on both the left and right sides of robot. When the robot collides with an obstacle through the crash sensor or detects obstacle through side-looking sensors, the robot can judge whether there is obstacle in the corresponding direction.

At present, the existing cleaning robot is in random cleaning mode in most of time, namely the cleaning robot may make cleaning while walking on the working surface. In the process of cleaning, it may adopt main brush in coordination with side brush. If it meets with an obstacle, it will move round the obstacle and continue cleaning. It will not intentionally make cleaning along the obstacle. If the bottom side of the obstacle is small or irregular, such as the leg of table or the leg of stool, the robot may move round such obstacle in the random cleaning mode, without causing influence on the cleaning effect. However, if the bottom side of obstacle is relatively big or regular, such as wall edge, since the robot will not make cleaning along the obstacle in the random cleaning mode, the region of wall edge is not properly cleaned. In order to thoroughly clean the region around the bottom edge of obstacle where it is unlikely to touch, the cleaning robot in the prior art also generally comprises edge-following cleaning mode. By changing the walking route of robot in the edge-following cleaning mode, it is feasible to allow the robot to make cleaning while walking along the bottom edge of obstacle. Its working principle is described as follows: a side sensor is designed to sense the obstacle, then a signal induction value with certain strength will be obtained. When a value is preset within the robot, the robot will compare the signal induction value sensed in real time with the pre-stored value, if the signal induction value sensed in real time equal to the pre-stored value, namely it is judged that the robot is nearest to the wall surface by this time, the robot will make edge-following cleaning along the wall, so as to thoroughly clean the area around the bottom side of obstacle where it is not accessible by the robot in the random cleaning mode. When the robot is working in edge-following cleaning mode, the area around the obstacle all can be cleaned before the robot exits from the edge-following cleaning mode.

At present, the conversion from random cleaning mode to edge-following cleaning mode can be realized in various modes. For example: 1. It is feasible to preset time. When the preset time is reached, the random cleaning mode is automatically switched into edge-following cleaning mode, namely, the robot will not long walk and clean at random, but will make direct movement until the side sensor of robot has detected a obstacle, then the robot will make edge-following cleaning; 2. It is feasible to preset the number of collision times. If the robot has collided such obstacles as wall by the preset times when it is making cleaning in the random cleaning mode, the robot is automatically switched from random cleaning mode to edge-following cleaning mode.

In the edge-following cleaning mode, the method for judging the distance between the robot and the obstacle such as wall is to compare the signal strength value sensed by the side sensor with a pre-stored fixed value. Since the mediums of wall surface have different reflectance values, the signal strength values sensed at the same distance are also different. However, another compared value is fixed. Therefore, due to different obstacle mediums, the robot will obtain different distances for edge-following cleaning. As shown in FIG. 1, for a same set of robot B working in the edge-following cleaning mode, when the medium of wall surface has high reflection factor, namely, the wall surface is a high reflecting surface 102, the robot operating in edge-following mode is far from the wall surface; when the medium of wall surface has low reflection factor, namely the wall surface is a low reflecting surface 101, the robot working in edge-following mode is nearer to the wall surface. Therefore, it is observed that, the distance between the robot in edge-following cleaning mode and the wall surface is affected by the medium of wall surface, it is not edge-following mode in the real sense.

Based on said problems, it is expected to provide a control method applicable to the autonomous moving floor-treating robot for edge-following floor-treating as well as an autonomous moving floor-treating robot has said function, so as to preferably make floor treating to the area nearby the wall and the area around the obstacle in the edge-following cleaning mode, so as to achieve even better cleaning effect.

SUMMARY OF THE INVENTION

With the view of the deficiencies in the prior art, it is the technical objective of the present invention to provide a control method applied to autonomous moving floor-treating robot for edge-following and an autonomous moving floor-treating device, so that the autonomous floor-treating robot can effectively treat the edge region of obstacle.

To address said technical problem, the present invention provides a control method applied to autonomous moving floor-treating robot for edge-following floor-treating. Specifically, the scheme I comprises the following steps:

Step 1: the floor-treating robot collides with an obstacle and is deflected toward the direction away from the obstacle by a basic angle after the collision, measures an initial signal strength value by a side-looking sensor after the deflection, and then moves on and treats the floor;

Step 2: a real-time signal strength value is acquired by said side-looking sensor after the robot has run for a predetermined time;

Step 3: the difference value between said real-time signal strength value and said initial signal strength value is compared, and whether the difference value is in a predetermined range is judged, if yes, the robot keeps moving and treating the floor; if not, proceed to step 4;

Step 4: the robot is driven to be deflected by an adjusting angle in the direction away from or approaching the obstacle and acquires a current real-time signal strength value;

Step 5: the difference value between the currently acquired real-time signal strength value and the real-time signal strength value acquired last time is obtained through comparison, and whether the difference value is in a predetermined range is judged, if yes, the robot keeps moving and treating the floor; if not, proceed to step 4.

In response to the solution 1, further, the solution 2 also comprises the following characteristics: in step 1, the value of basic angle is determined according to the sense signals of the angle recognition sensors provided on different points at the end of the robot in direction of the robot's walking as well the corresponding relation between the angle recognition sensor and the basic angle.

With respect to the solution 2, the solution 3 also comprises the following characteristics: when there is one said side-looking sensor, and two angle recognition sensors are set at the end of the robot in direction of the robot's walking, the corresponding relation between the angle recognition sensor and the basic angle is described as follows: when the detected sensor signal is sent from the angle recognition sensor on the same side of the side-looking sensor, the corresponding basic angle is 45°; when the detected sensor signal is sent from the angle recognition sensor on the opposite side of the side-looking sensor, the corresponding basic angle is 135°; when the detected sensor signals are sent from two angle recognition sensors, the corresponding basic angle is 90°.

With respect to the solution 2, the solution 4 further comprises the following characteristics: when there is one said side-looking sensor, and six angle recognition sensors are set at the end of the robot in direction of the robot's walking, the corresponding relation between the angle recognition sensor and the basic angle is described as follows: when the detected sensor signal is sent from single angle recognition sensor, starting from the first angle recognition sensor on the same side of the side-looking sensor, the corresponding basic angles are 0, 36°, 72°, 108°, 144° and 180°.

With respect to the solution 2, the solution 5 also comprises the following characteristics: when there are two said side-looking sensors, and two angle recognition sensors are set at the end of the robot in direction of the robot's walking, and the detected sensor signal is from single angle recognition sensor, the basic angle corresponding to each angle recognition sensor is 45°.

With respect to the solution 2, the solution 6 further comprises the following characteristics: when there are two said side-looking sensors, and six angle recognition sensors are set at the end of the robot in direction of the robot's walking, the corresponding relation between the angle recognition sensor and the basic angle is described as follows: when the detected sensor signal is sent from single angle recognition sensor, starting from the first angle recognition sensor on the same side of the side-looking sensor, the corresponding basic angles are 0°, 36° and 72°.

With respect to the solutions 3-6, the solution 7 further comprises the following characteristics: when the sense signals from a plurality of angle recognition sensors are detected, the basic angle is equivalent to the average value of the angles corresponding to two adjacent angle recognition sensors with the largest signal strength.

With respect to the solutions 3-6, the solution 8 further comprises the following characteristics: when the sense signals from a plurality of angle recognition sensors are detected, the basic angle is equivalent to the sum of the products, each of which is obtained when the angle corresponding to each angle recognition sensor is multiplied with its respective weight.

With respect to the solution 1, the solution 9 further comprises the following characteristic: if the difference value obtained by subtracting the last real-time signal strength from the present real-time signal strength is a negative value beyond the predetermined range, the robot is driven to be deflected by an adjusting angle in the direction approaching the obstacle.

With respect to the solution 1, the solution 10 further comprises the following characteristic: if the difference value obtained by subtracting the last real-time signal strength from the present real-time signal strength is a positive value beyond the predetermined range, the robot is driven to be deflected by an adjusting angle in the direction away from the obstacle.

With respect to the solution 1, the solution 11 further comprises the following characteristic: the adjusting angle is a fixed angle or is determined according to the functional relation between the angle and the difference value that is between the current real-time value of signal strength and the last real-time value of signal strength.

With respect to the solution 11, the solution 12 further comprises the following characteristic: the adjusting angle is 0~20°.

With respect to the solution 12, the solution 13 further comprises the following characteristic: the adjusting angle is 0~10°.

The present invention also provides an autonomous moving floor-treating robot, comprising a functional component, a walking unit, a driving unit and a side-looking sensor located on the side of robot and a control unit; the side-looking sensor is designed to detect whether there is an obstacle on the side of robot and to send the detected information to the control unit; the control unit is respectively connected with the functional component and the drive unit, and the drive unit is connected with the walking unit, the drive unit is used to receive the instruction from the control unit and drive the walking unit to walk according to the predetermined route, and the functional component is used to receive the instruction of the control unit, so as to make floor treatment according to the predetermined working mode; the control unit is designed to control the functional component and the driving unit to operate according to said methods.

As can be known from said solutions, the present invention has fundamentally overcome the following defect of the prior art: since the side-looking sensor has different sense values for the obstacles of different medium, the robot operating in the edge-following floor-treating mode has different distances from the obstacles to different medium, so it fails to realize the edge-following floor-treating in the true sense.

DETAILED DESCRIPTION OF THE PREFERRED EMBODIMENTS

Figure 1:
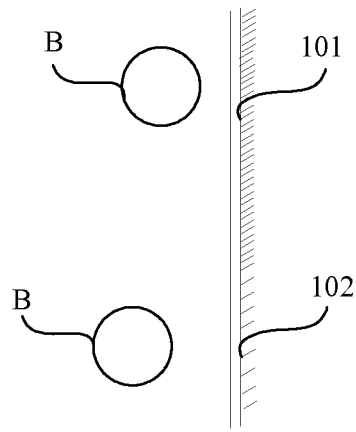
FIG. 1 is the simplified schematic diagram showing that a same set of robot in the prior art is making cleaning at the edges of different obstacles.
Figure 2:
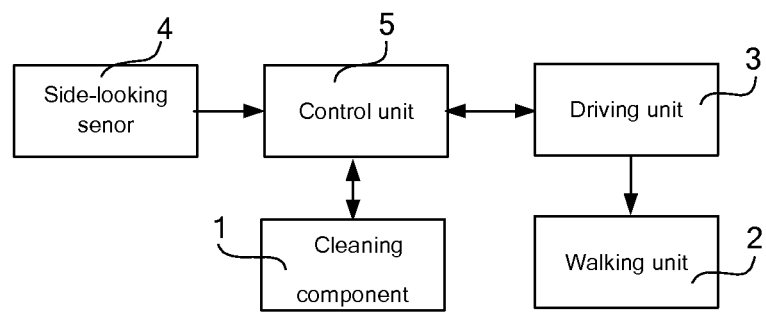
FIG. 2 is the structural composition diagram of the autonomous moving cleaning robot of the present invention.

FIG. 2 is the structural composition diagram of the autonomous moving cleaning robot of the present invention. As shown in FIG. 2, the autonomous moving cleaning robot comprises a cleaning component 1, a walking unit 2, a drive unit 3, a side-looking sensor 4 located on the side of robot and a control unit 5, and the cleaning robot is provided with random cleaning mode and edge-following cleaning mode; the side-looking sensor 4 is designed to detect whether there is obstacle on the side of robot and to send the detected information to the control unit 5; the control unit 5 is respectively connected with the cleaning component 1 and the drive unit 3, and the drive unit 3 is connected with the walking unit 2, the drive unit 3 is used to receive the instruction from the control unit 5 and drive the walking unit 2 to walk, and the cleaning component 1 is used to receive the instruction of the control unit 5, so as to make floor treating according to the predetermined working mode; the walking mode of the robot is relevant with the cleaning mode. For example, when the robot is working in the random cleaning mode and in the edge-following cleaning mode, the walking mode of robot and the cleaning mode of the cleaning component 1 are different. In addition, the cleaning component 1 is functional component, which is different according to the robot with different functions.

Figure 3:
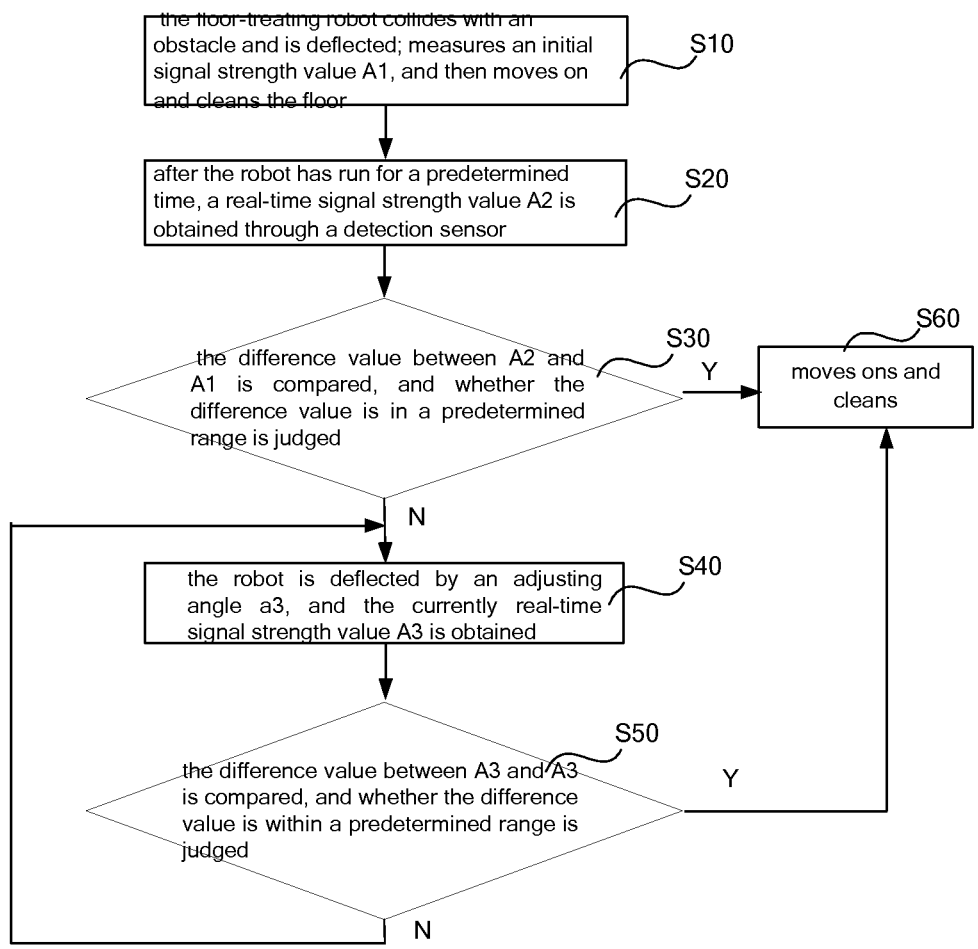
FIG. 3 is the flow diagram of the edge-following cleaning control method of the present invention.

Specifically, in the edge-following cleaning mode, the control unit controls the said functional components namely the cleaning component and the drive unit to operate according to the following steps. FIG. 3 is the flow diagram of the edge-following cleaning control method of the present invention;

FIGS. 4-7 are simplified schematic diagrams showing that the autonomous moving cleaning robot is operating in edge-following cleaning mode. Refer to FIG. 3 in combination with FIGS. 4-7.

Step S10: in the movement process, when the random cleaning mode is changed as edge-following cleaning mode, the robot is controlled to collide with an obstacle and is deflected toward the direction away from the obstacle by a basic angle α2 after the collision, measures an initial signal strength value A1 by a side-looking sensor after the deflection, and then moves on and treats the floor.

Figure 4:
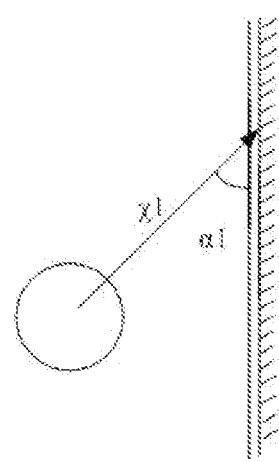
FIG. 4 is the simplified schematic diagram showing that the autonomous moving cleaning robot of the present invention operating in edge-following cleaning is making collision.
Figure 5:
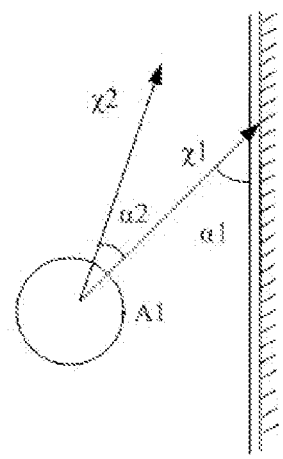
FIG. 5 is the simplified schematic diagram showing that the autonomous moving g robot of the present invention is deflected after collision when it is operating in edge-following cleaning mode.

When the robot collides with an obstacle, such as wall, the simplified schematic diagram of collision is shown in FIG. 4, where α1 represents the entrance angle, and χ1 represents the walking direction of robot. FIG. 5 is the simplified schematic diagram showing that the autonomous moving cleaning robot is deflected after collision. Then, the walking direction of robot is changed from χ1 to χ2, and the included angle between two walking directions χ1 and χ2 is the basic angle of deflection α2.

After the robot collides with the obstacle, the robot is designed to be turned to run in parallel with the obstacle, so that the robot can make cleaning when it is kept close to the obstacle as much as possible. However, how to enable the robot to run in parallel with the parallel? The present invention applies the following principle "if the alternate interior angles between two straight lines are equivalent, these two straight lines are in parallel". In order to make the walking direction of the robot to be in parallel with the obstacle, it is feasible to control the basic angle α2 of the robot after deflection to be equivalent with the entrance angle α1 as much as possible. If the basic angle a2 is equivalent with the entrance angle a1, it is possible to guarantee that the walking direction of the robot is in parallel with the obstacle.

Figure 12:
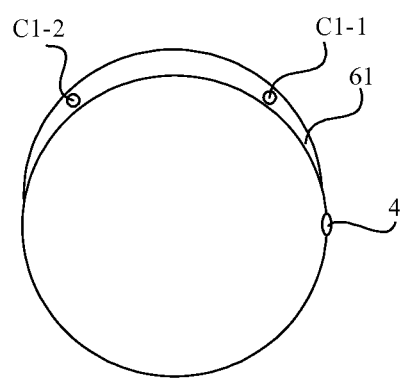
FIG. 12 is the simplified schematic diagram of an embodiment of the sensors distributed over the striking plate of the robot of the present invention.

Since the robot collides with the obstacle at random entrance angle, it is very difficult to timely and accurately measure the specific value of this entrance angle. In an embodiment of the present invention, a striking plate is set at the end of robot in the walking direction, and angle recognition sensors are set at various positions of the striking plate, and the value of the basic angle α2 is determined according to the corresponding relation between the angle recognition sensors and the basic angle. Wherein, there are may be a plurality of angle recognition sensors. Then the corresponding relation between each angle recognition sensor and the basic angle is also related to the number of the side-looking sensors. When there is one side-looking sensor, and two angle recognition sensors are provided at the end of the robot in direction of the robot's walking, as shown in FIG. 12, the corresponding relation between the angle recognition sensors and the basic angle is as shown in Table 1:

TABLE 1

| | Angle recognition sensor | |
|---|---|---|
| | C1-1 | C1-2 |
| Basic angle | 45° | 135° |

Wherein, C1-1 represents the angle recognition sensor on the same side of the side-looking sensor 4, and C1-2 represents the angle recognition sensor on the opposite side of the side-looking sensor.

Figure 13:
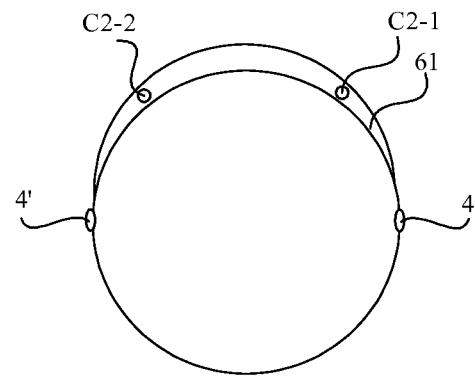
FIG. 13 is the simplified schematic diagram of another embodiment of the sensors distributed over the striking plate of robot of the present invention.

If there are two side-looking sensors which are respectively located on both sides in the walking direction of robot, and two angle recognition sensors are set at the end of the robot in direction of the robot's walking, as shown in FIG. 13, the corresponding relation between the angle recognition sensors and the basic angle is shown in Table 2:

TABLE 2

|  | Angle recognition sensors | |
| --- | --- | --- |
|  | C2-1 | C2-2 |
| Basic angle | 45° | 45° |

Wherein, C1-1 represents the angle recognition sensor on the same side of the side-looking sensor 4, and C2-2 represents the angle recognition sensor on the same side of the side-looking sensor 4'.

Figure 14:
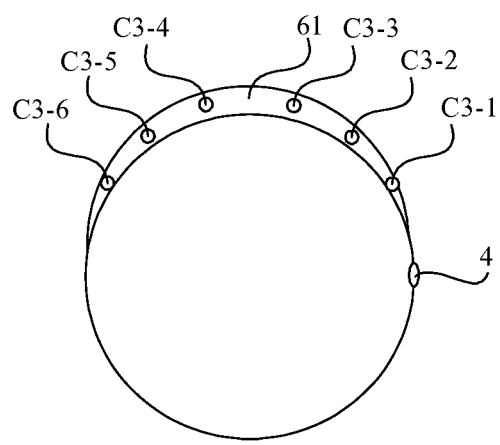
FIG. 14 is the simplified schematic diagram of another embodiment of the sensors distributed over the striking plate of robot of the present invention.

When there is one said side-looking sensor, and six angle recognition sensors are set at the end of the robot in direction of the robot's walking, as shown in FIG. 14, the corresponding relation between the angle recognition sensors and the basic angle is described as follows: when the detected sensor signal is sent from single angle recognition sensor, starting from the first angle recognition sensor on the same side of the side-looking sensor 4, the corresponding basic angles are 0, 36°, 72°, 108°, 144° and 180° in turn, as shown in Table 3.

TABLE 3

|  | Angle recognition sensor | | | | | |
| --- | --- | --- | --- | --- | --- | --- |
|  | C3-1 | C3-2 | C3-3 | C3-4 | C3-5 | C3-6 |
| Basic angle | 0° | 36° | 72° | 108° | 144° | 180° |

Wherein, C3-1 represents the first angle recognition sensor on the same side of the side-looking sensor 4.

Figure 15:
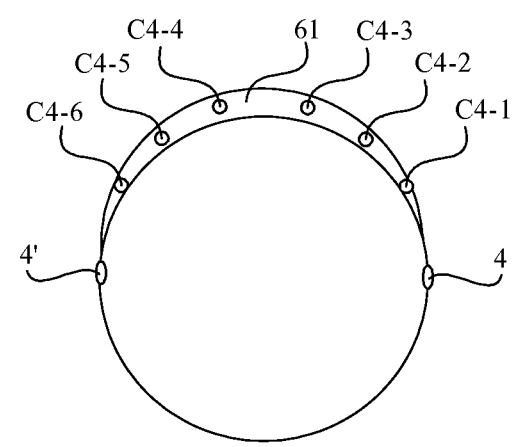
FIG. 15 is the simplified schematic diagram of another embodiment of the sensors distributed over the striking plate of robot.

If there are two side-looking sensors, and six angle recognition sensors are set at the end of the robot in direction of the robot's walking, as shown in FIG. 15, the corresponding relation between the angle recognition sensors and the basic angle is shown in Table 4:

TABLE 4

|  | Angle recognition sensor | | | | | |
| --- | --- | --- | --- | --- | --- | --- |
|  | C4-1 | C4-2 | C4-3 | C4-4 | C4-5 | C4-6 |
| Basic angle | 0° | 36° | 72° | 72° | 36° | 0° |

Wherein, C4-1 represents the first angle recognition sensor on the same side of the side-looking sensor 4, and C4-6 represents the last angle recognition sensor on the same side of the side-looking sensor 4'.

The above-mentioned a plurality of sensors are respectively located on both left and right sides of the striking plate, the angle recognition sensors on both sides present axial symmetrical distribution with the walking direction of robot as the axial line. Certainly, the angle recognition sensors on both sides may also in unsymmetrical distribution.

In addition to presenting axial symmetrical distribution, the angle recognition sensors may also present even distribution. For example, when the robot is in circular shape, the angle recognition sensors may be evenly distributed over the first semi-circumference in the walking direction of robot. The method for judgment is the same as the aforementioned method, but the angle value is more accurate.

When the multiple sensors are provided, such as six sensors, the robot may receive the signals from multiple sensors at a time, such as three signals as shown in FIG. 15. If it receives multiple signals, the robot will firstly determine two adjacent angle recognition sensors with the highest signal strength, such as C4-2 and C4-3, then select the angles 36° and 72° corresponding to these two sensors, and finally take the average value 54° of these two angles as the basic angle.

In order to determine the value of basic angle with higher accuracy, it is feasible to make calculation based on the concept of weight. For example, the weight of each angle recognition sensor is distributed according to each sense signal, the angle corresponding to each angle recognition sensor corresponding to each sense signal is respectively multiplied with its respective weight, these products are added together to obtain the total, and the total is the value of basic angle. For example, when the values sensed by C4-1, C4-2 and C4-3 are respectively 0.6, 0.8 and 0.9, it is feasible to obtain their respective weights: 6/(6+8+9), 8/(6+8+9) and 9/(6+8+9), these weights are multiplied by their respective angles, and the products are added together to derive the basic angle $\alpha 2$:

$$\alpha 2 = 6*0°/(6+8+9)+8*36°/(6+8+9)+9*72°/(6+8+9) \approx 40°$$

The basic angle $\alpha 2$ obtained through said calculation is more accurate.

Through said method, it is feasible to allow the basic angle $\alpha 2$ to be equal to the entrance angle $\alpha 1$ as much as possible. Certainly, if the accuracy requirement is not very high, it is also not necessary to set the relation between the basic angle $\alpha 2$ and the entrance angle $\alpha 1$.

Figure 6:
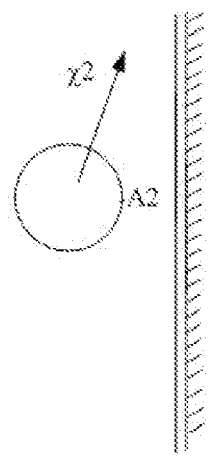
FIG. 6 is the simplified schematic diagram showing a period of operation time after deflection based on FIG. 5.

Step S20: after being deflected by a basic angle $\alpha 2$, the robot walks along the walking direction $\chi 2$; after running for a preset time, the robot obtains a real-time signal strength value A2 through the side-looking sensor, as shown in FIG. 6.

Step S30: the difference value between said real-time signal strength value A2 and said initial signal strength value A1 is compared, and whether the difference value is in a predetermined range is judged, if yes, the robot keeps moving and cleaning the floor, if not, proceed to step S40, wherein, the predetermined range is a error range. According to principle, it is necessary to judge whether the real-time signal strength value A2 is equivalent to the initialize signal strength value A1, namely whether the difference value between them is 0. If the difference value is 0, these two positions have the equivalent distance from the wall, thus it is judged that the walking direction of robot is parallel with the wall, namely the objective of the present invention is achieved. However, due to the existence of various factors, there will be error in the signal strength value sensed by the sensor. In order to avoid the misjudgment resulted from error, it is feasible to set an appropriate range. So long as the difference value between the strength values of two signals is within this range, it is reasonable to believe that these two signals have the same strength value. The smaller this range is, the operating accuracy of robot is higher, and there will be more times of adjustment.

Figure 7:
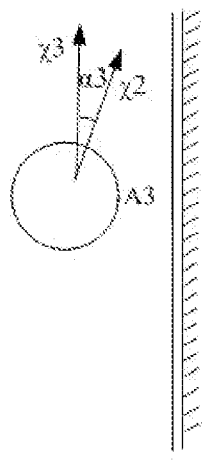
FIG. 7 is the simplified schematic diagram of deflection based on FIG. 6.

Step S40: the robot is driven to be deflected by an adjusting angle $\alpha 3$ in the direction away from or approaching the obstacle, and the current real-time signal strength value A3 is obtained. As shown in FIG. 7, the walking direction before the deflection by an adjusting angle $\alpha 3$ is $\chi 2$, the walking direction after the deflection is $\chi 3$, and the included angle between $\chi 2 \leftrightarrows \chi 3$ is $\alpha 3$.

Figure 8:
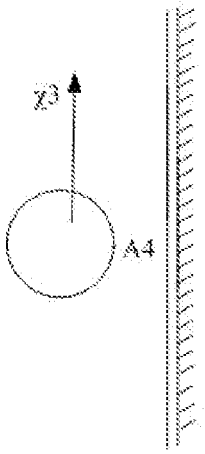
FIG. 8 is the simplified schematic diagram showing a period of operation time after deflection based on FIG. 7.

Step S50: the difference value between the currently obtained real-time signal strength value A3 and the last real-time signal strength value A2 is obtained through comparison, and whether this difference value is within a predetermined range is judged, if yes, the robot keeps moving and cleaning the floor, as shown in FIG. 8; if not, proceed to step S40, and such steps as deflection, walking and comparison are repeated.

Wherein, if the difference value obtained by subtracting the last real-time signal strength from the present real-time signal strength is a negative value beyond the predetermined range, it is regarded as that the walking direction of the robot is gradually kept away from the obstacle, then it is necessary to drive the robot to be deflected by an adjusting angle in the direction approaching the obstacle.

To prevent the robot from being too close to the obstacle in the walking process, which may lead to continuous posture adjustment or collision with obstacle, in the preferred embodiment it is feasible to detect and compare the enhancement of signal strength detected in the walking process.

The specific steps are described as follows: if the obtained signal strength is even higher when the side view sensor is more closer to the obstacle, and if the difference value obtained by subtracting the last real-time signal strength from the present real-time signal strength is a positive value beyond the predetermined range, it is regarded as that the walking direction of robot is gradually approaching the obstacle, then it is necessary to drive the robot to be deflected by an adjusting angle in the direction away from the obstacle.

In said process adjustment, the adjusting angle at each time of adjustment may be the same angle, namely a fixed preset value, such as 0~20° or 0~10°, and the adjusting angle can also be determined according to the functional relation between the angle and the difference value that is between the current real-time value of signal strength and the last real-time value of signal strength. For example, it is feasible to establish a linear relation between this difference value and the angle. The bigger this difference value is, the parallelism between the walking direction and the obstacle is poorer, and a high angle is needed for adjustment, so that in fact the adjusting angle used to adjust the walking direction is higher. After obtaining the difference value between the two real-time signal strength values obtained at two times, it is also necessary to determine the steps for adjusting the angle through calculation or table look-up.

For the purpose of time keeping, such as the time interval of the signal strength values determined at two times, in addition to the software-based time mode, it is also feasible to incorporate a hardware timer in the present invention. In order to set such parameters involved in the present invention, such as the specific values of the basic angle α2 and the adjusting angle α3 as well as the time interval between the signal strength values measured at two times, the present invention also comprises an operation panel designed to set parameters through setting keys.

In the present invention, the cleaning component 1, the walking unit 2 and the drive unit 3 are controlled by the control unit to jointly complete the said process.

Figure 9:
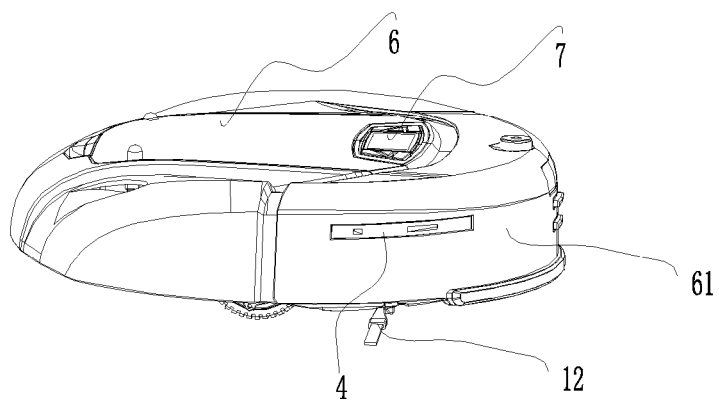
FIG. 9 is appearance structure diagram 1 of a specific embodiment of the autonomous moving cleaning robot of the present invention.
Figure 10:
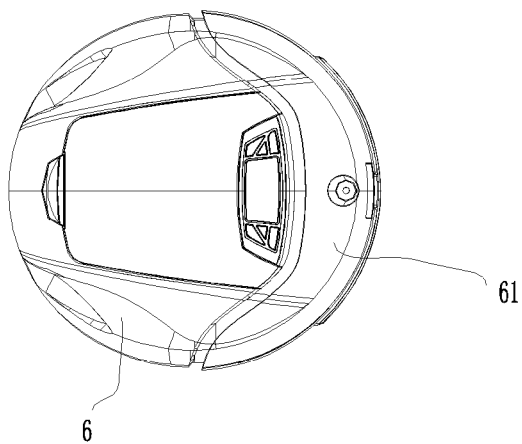
FIG. 10 is appearance structure diagram 2 of a specific embodiment of the autonomous moving cleaning robot of the present invention.
Figure 11:
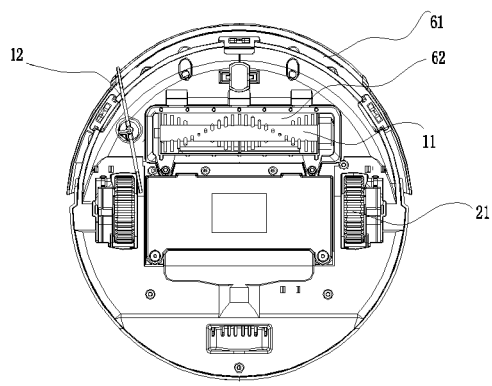
FIG. 11 is appearance structure diagram 3 of a specific embodiment of the autonomous moving cleaning robot of the present invention.

The appearance structure of a specific embodiment of the present invention is as shown in FIGS. 9-11. The cleaning robot comprises a body 6, wherein a striking plate 61 is provided in the front of the body 6. The angle recognition sensors are provided on left and right positions of striking plate. The angle recognition sensor is ultrasonic sensor, proximity sensor or infrared sensor. The drive unit 3 is a motor provided inside the body, the walking unit 2 is the driving wheel 21 described in the Fig, the cleaning component 1 comprises a main brush 11 and a side brush 12; an operation panel 7 is also provided at the top of body, and a side-looking sensor 4 is set on the side of body. The side-looking sensor 4 can be an infrared sensor comprising a sending component and a receiving component, which both are provided at the front side of the robot. The sending component is used to send infrared light, while the receiving component is used to receive the light reflected from the detected object. Weather there is an obstacle on the side of the robot is judged by the fact whether the receiving component has received the reflected light. Whether the reflected light is strong or weak is related to the strength of the received the signal, while this signal strength is finally represented in form of voltage.

For the walking state of robot, such as walking direction and speed, the control unit is designed to send control instructions to the motor, and the motor drives the driving wheel 21 to rotate according to the control instruction, so as to enable to the robot to walk. In a specific embodiment, there are two driving wheels 21, which are respectively controlled by a motor. When two driving wheels 21 have the same parameters such as rotation speed, the robot can walk in the linear direction. If the robot tends to make a turn, namely to deviate from the original walking direction, the control unit controls the two driving wheels to make rotation at non-uniform speed, so that the robot turns to the direction where the driving wheel with lower rotation speed is located.

As shown in FIGS. 9-11, the cleaning component 1 comprises a main brush 11 and a side brush 12. Of course, other cleaning components may also be included, such as vacuum cleaner provided inside the robot. In the process of cleaning, these cleaning components can work in coordination. For example, when the robot is treating the floor in edge-following mode, the edge brush 12 is used to sweep out the dust and waste on the edge of obstacle and to sweep the dust and waste into the internal dust collection box through an ash inlet 62 set at the bottom of the robot. The vacuum cleaner and the main brush 11 are designed to make cleaning in coordination with the side brush.

The present invention is free from the influence of the obstacle medium, and can enable the robot to realize edge-following cleaning in very deed.

The autonomous moving robot described in the embodiment has the cleaning function. In addition, the autonomous moving robot can also act as a waxing robot. Through the waxing device (namely functional component) which extends to the outside of robot, the autonomous moving robot can also make waxing on the edge-following floor while it is making edge-following movement. The waxing device on the side can fixedly extend to the outside of robot and can also in telescopic form. According to the actual need, different functional components are set in the autonomous moving floor-treating robot of the present invention, such as cleaning unit, waxing unit and polishing unit, etc, so as to fulfill the need for making different floor treatments.

Finally it must be mentioned as follows: said embodiments are merely used to describe rather than limit the present invention; Although the detailed description of the present invention is provided with reference to preferred embodiments, those skilled in the art should understand that all the modifications or equitable substitutions to the present invention without deviation from the spirit and range of present invention shall be covered by the claims of present invention.

The invention claimed is:

1. A control method applied to an autonomous moving floor-treating robot for edge-following floor-treating, characterized in the following: the control method comprises the following steps:
    step 1: the floor-treating robot collides with an obstacle and is deflected toward the direction away from the obstacle by a basic angle after the collision, measures an initial signal strength value by a side-looking sensor after the deflection, and then moves on and treats the floor;

step 2: a real-time signal strength value is acquired by said side-looking sensor after the robot has run for a predetermined time;

step 3: the difference value between said real-time signal strength value and said initial signal strength value is compared, and whether the difference value is in a predetermined range is judged, if yes, the robot keeps moving and treating the floor; if not, proceed to step 4;

step 4: the robot is driven to be deflected by an adjusting angle in the direction away from or approaching the obstacle and acquires the current real-time signal strength value;

step 5: the difference value between the currently acquired real-time signal strength value and the real-time signal strength value acquired last time is obtained through comparison, and whether the difference value is in a predetermined range is judged, if yes, the robot keeps moving and treating the floor; if not, proceed to step 4.

2. The control method applied to an autonomous moving floor-treating robot for edge-following floor-treating of claim 1, characterized in the following:
in step 1, the value of basic angle is determined according to the sense signals of the angle recognition sensors provided on different points at the end of the robot in direction of the robot's walking as well the corresponding relation between the angle recognition sensor and the basic angle.

3. The control method applied to an autonomous moving floor-treating robot for edge-following floor-treating of claim 2, characterized in the following: when there is one said side-looking sensor, and two angle recognition sensors are set at the end of the robot in direction of the robot's walking, the corresponding relation between the angle recognition sensor and the basic angle is described as follows: when the detected sensor signal is sent from the angle recognition sensor on the same side of the side-looking sensor, the corresponding basic angle is 45°; when the detected sensor signal is sent from the angle recognition sensor on the opposite side of the side-looking sensor, the corresponding basic angle is 135°; when the detected sensor signals are sent from two angle recognition sensors, the corresponding basic angle is 90°.

4. The control method applied to an autonomous moving floor-treating robot for edge-following floor-treating of claim 2, characterized in the following: when there is one side-looking sensor, and six angle recognition sensors are set at the end of the robot in direction of the robot's walking, the corresponding relation between the angle recognition sensor and the basic angle is described as follows: when the detected sensor signal is sent from single angle recognition sensor, starting from the first angle recognition sensor on the same side of the side-looking sensor, the corresponding basic angles are 0°, 36°, 72°, 108°, 144° and 180° respectively; when the detected sense signals from a plurality of angle recognition sensors are detected, the basic angle is equivalent to the average value of the angles corresponding to two adjacent angle recognition sensors with the largest signal strength; or the basic angle is equivalent to the sum of the products, each of which is obtained when the angle corresponding to each angle recognition sensor is multiplied with its respective weight.

5. The control method applied to an autonomous moving floor-treating robot for edge-following floor-treating of claim 2, characterized in the following: when there are two said side-looking sensors, and two angle recognition sensors are set at the end of the robot in direction of the robot's walking, the corresponding relation between the angle recognition sensor and the basic angle is described as follows: when the detected sensor signal is sent from single angle recognition sensor, the basic angle corresponding to each angle recognition sensor is 45°.

6. The control method applied to an autonomous moving floor-treating robot for edge-following floor-treating of claim 2, characterized in the following: when there are two side-looking sensors, and six angle recognition sensors are set at the end of the robot in direction of the robot's walking, the corresponding relation between the angle recognition sensor and the basic angle is as follows: when the detected sensor signal is sent from single angle recognition sensor, starting from the first of the angle recognition sensors on the same side of the angle recognition sensor, the corresponding basic angles are 0°, 36°, and 72° respectively; when the detected sense signals from a plurality of angle recognition sensors are detected, the basic angle is equivalent to the average value of the angles corresponding to two adjacent angle recognition sensors with the largest signal strength; or the basic angle is equivalent to the sum of the products, each of which is obtained when the angle corresponding to each angle recognition sensor is multiplied with its respective weight.

7. The control method applied to autonomous moving floor-treating robot for edge-following floor-treating of claim 1, characterized in the following: if the difference value obtained by subtracting the last real-time signal strength from the present real-time signal strength is a negative value beyond the predetermined range, the robot is driven to be deflected by an adjusting angle in the direction approaching the obstacle.

8. The control method applied to autonomous moving floor-treating robot for edge-following floor-treating of claim 1, characterized in the following: if the difference value obtained by subtracting the last real-time signal strength from the present real-time signal strength is a positive value beyond the predetermined range, the robot is driven to be deflected by an adjusting angle in the direction away from the obstacle.

9. The control method applied to autonomous moving floor-treating robot for edge-following floor-treating of claim 1, characterized in the following: the adjusting angle is a fixed angle or is determined according to the functional relation between the angle and the difference value that is between the current real-time value of signal strength and the last real-time value of signal strength.

10. The control method applied to autonomous moving floor-treating robot for edge-following floor-treating of claim 9, characterized in the following: the adjusting angle is 0~20°.

11. The control method applied to autonomous moving floor-treating robot for edge-following floor-treating of claim 10, characterized in the following: the adjusting angle is 0~10°.

12. An autonomous moving floor-treating robot, comprising a functional component, a walking unit, a driving unit and a side-looking sensor located on the side of robot and a control unit; the side-looking sensor is designed to detect whether there is an obstacle on the side of robot and to send the detected information to the control unit;

the control unit is respectively connected with the functional component and drive unit, and the drive unit is connected with the walking unit, the drive unit is configured to receive the instruction from the control unit and drive the walking unit to walk according to the predetermined route, and the functional component is configured to receive the instruction of control unit, so as to make floor treatment according to the predetermined working mode;

characterized in the following: the control unit is designed to control the functional component and driving unit to operate according to the method of claim 1.

13. The autonomous moving floor-treating robot of claim 12, characterized in the following: the autonomous moving floor-treating robot also comprises a striking plate at the end in the walking direction of robot, and a angle recognition sensor configured to determine the basic angle is provided on the striking plate.

14. The autonomous moving floor-treating robot of claim 13, characterized in the following: a plurality of angle recognition sensors are respectively located on both the left and right sides of the striking plate.

15. The autonomous moving floor-treating robot of claim 14, characterized in the following: the angle recognition sensors on both sides present axial symmetrical distribution with the walking direction of robot as the axial line.

16. The autonomous moving floor-treating robot of claim 13, characterized in the following: the angle recognition sensor is ultrasonic sensor, proximity sensors or infrared sensor.

17. The autonomous moving floor-treating robot of claim 12, characterized in the following: the side-looking sensor on the side of the robot is an infrared sensor.

18. The autonomous moving floor-treating robot of claim 12, characterized in the following: the autonomous moving floor-treating robot also comprises a timer configured to keep the preset operating time of the robot.

19. The autonomous moving floor-treating robot of claim 12, characterized in the following: the autonomous moving floor-treating robot also comprises an operation panel, and the operation panel also comprises parameter setting keys.

20. The autonomous moving floor-treating robot of claim 12, characterized in the following: the functional component comprises a cleaning component, a waxing component, a polishing component, or any combination thereof.

21. The autonomous moving floor-treating robot of claim 14, characterized in the following: the angle recognition sensor is ultrasonic sensor, proximity sensors or infrared sensor.

22. The autonomous moving floor-treating robot of claim 15, characterized in the following: the angle recognition sensor is ultrasonic sensor, proximity sensors or infrared sensor.

* * * * *